Nov. 18, 1924. 1,516,386
A. KÉGRESSE
DRIVING PULLEY FOR ENDLESS FLEXIBLE TRACK BELTS
Original Filed April 27, 1923
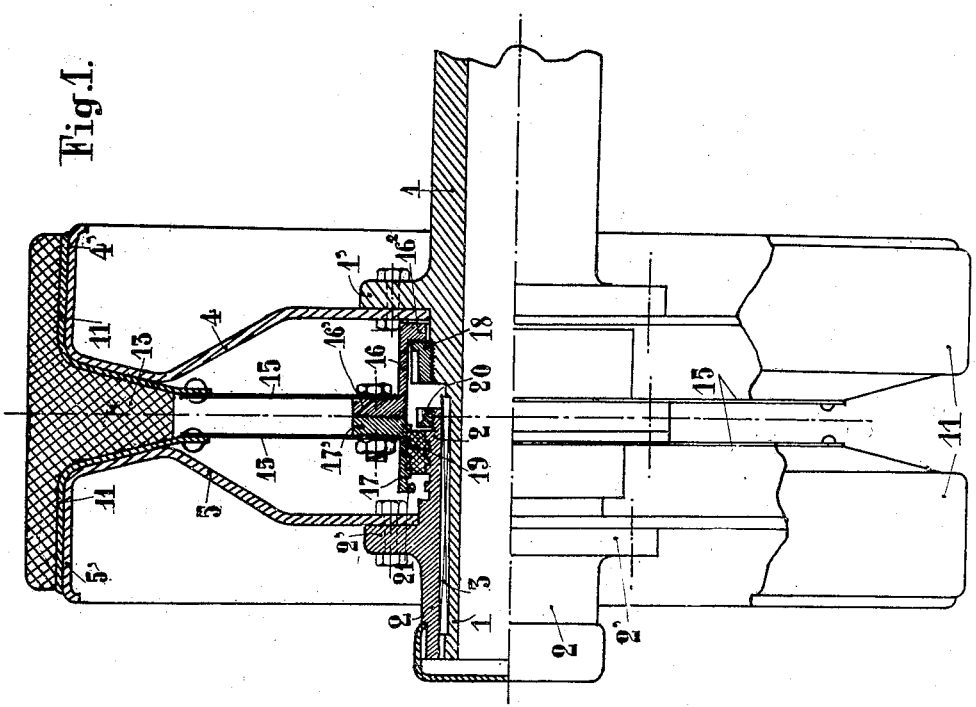
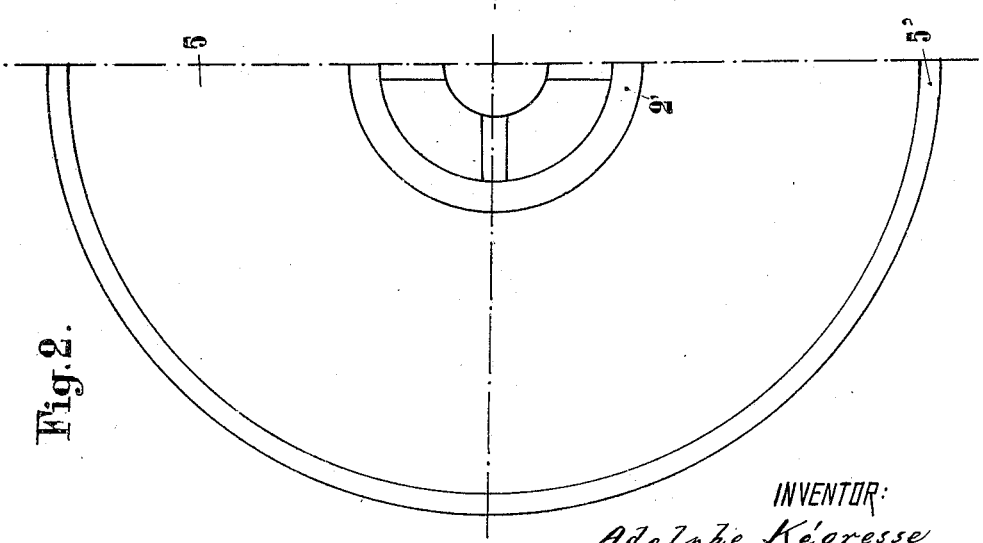
INVENTOR:
Adolphe Kégresse
BY
ATTORNEY Patented Nov. 18, 1924.

1,516,386

UNITED STATES PATENT OFFICE.

ADOLPHE KÉGRESSE, OF PARIS, FRANCE.

DRIVING PULLEY FOR ENDLESS FLEXIBLE TRACK BELTS.

Original application filed April 27, 1923, Serial No. 635,052. Divided and this application filed March 19, 1924. Serial No. 700,331.

*To all whom it may concern:*

Be it known that I, ADOLPHE KÉGRESSE, a citizen of the Republic of France, residing at Paris, France, have invented certain new and useful Improvements in Driving Pulleys for Endless Flexible Track Belts, of which the following is a specification.

In endless track motor vehicles, the required adherence of the flexible endless track belt to the driving wheels is produced either by mere tension or by means of a hub designed for the purpose and whereby the two halves or cheeks forming the driving wheel are pressed by the driving power against the sides of the projection or inner rib of the T-shaped belt. The vehicle being designed to travel over any kind of ground, the coefficient of adherence of the endless track belt on the driving wheel varies within wide limits according to the nature or character of the surface over which the vehicle is moving. In thawing snow or mud, for instance, the coefficient is much lower than when travelling in sand. Consequently, the grip on the endless belt should be altered accordingly. In other words, it should be tighter on greasy and slippery ground than when the latter is dry or sandy.

The present invention relates to a driving wheel for endless track belts of the above type which is so constructed as to provide for an automatic gripping of the belt by the two main members of the wheel to the required extent, irrespective of the character of the ground over which the vehicle is travelling; the invention herein claimed being a division of that disclosed in my prior parent application, filed April 27, 1923, No. 635,052, which, in turn, like this application, is essentially in the nature of an improvement on, or development of, the invention disclosed in a still earlier application, No. 457,109, filed March 30, 1922, and corresponding to my French patent of April 3, 1917, No. 494,526.

According to the present invention, the construction shown in my aforesaid application No. 457,109 is modified to the extent that one of the two main members of the wheel is fixed to and driven by the axle, while the other is driven from the axle through the intermediary of a hub to which it is directly fastened; the aforesaid hub being keyed to the axle to slide thereon toward the fixed member so as to exert the desired gripping pressure against the belt rib. The sliding movement of the hub is designed to take place automatically when slippage of the belt occurs, and is preferably effected by means of a second or false hub or collar which is rotated consequent upon such slippage and which transmits its rotary movement, through the agency of an externally and internally toothed ring, to the sliding hub, with the result that the latter and its wheel member are forcibly moved toward the other or fixed wheel member.

An embodiment of the invention is illustrated in the accompanying drawings, wherein:

Figure 1 is a transverse section of the improved wheel, and Fig. 2 is a side elevation of one half of the wheel.

Referring more particularly to the drawing, 1 indicates the driving shaft or axle, and 2 a hub which is mounted to slide axially on the axle and is connected to the same by keys 3 so as to be driven by said axle during its rotation. The axle and hub are provided with circumferential flanges 1′ and 2′; and to these flanges are rigidly secured the inner portions of the main members or cheeks 4 and 5, which cheeks have their outer portions 4′ and 5′ bent laterally outward to form rims. The rims 4′ and 5′ constitute supports for a pair of annular false rims 11 which conform to the shape of the parts 4, 4′, 5 and 5′ and fit loosely thereon so as to be capable of rotary movement relative to said parts under certain circumstances, as subsequently explained. The endless flexible track belt 13 fits directly and conformably on the rims 11, as shown, with its inner projection or rib extending immediately between the inner portions of said rims so as to be gripped thereby; the said rims 11 being so constructed that their coefficient of adherence with relation to the belt is greater than that with relation to the main rims 4′ and 5′, so that slippage is always between the parts 11 and 4′ and 5′.

The inner portions of the false rims 11 are connected by two flexible webs 15 to a false hub or collar made in two sections 16 and 17 having circumferential flanges 16′ and 17′ to which the webs 15 are directly fastened by bolts or the like. The outer edge portion of the section 16 is formed with an inturned flange $16^2$ which projects loosely into the annular space or recess between the inner edge portion of the right-hand cheek 4 and a ring 18 which is tightly screwed on the axle 1; and the section 17 is internally threaded to engage the external threads formed on a nut or ring 19 which is interposed between said section 17 and the inner end of the sliding hub 2, the latter having external threads at its said end for engagement with the internal threads also formed on the ring 19. The outer threads on ring 19 run oppositely to the inner ones thereon; and as a result thereof, the rotary movement imparted to the false hub under the conditions hereafter explained will be transmitted to ring 19 which will thereby be rotated and caused to move axially or sidewise, such movement being limited in one direction by a stop collar 20 tightly threaded on the extreme inner end of hub 2, and in the other direction by an in-turned flange 21 on the outer edge portion of section 17.

The operation is substantially as follows: The endless flexible belt 13 is driven from the axle 1 by means of the cheeks 4 and 5 and the false rims 11; said rims directly engaging the belt and being forced against it by the lateral pressure exerted by the cheeks on the rims themselves. When slippage of the belt occurs, it will take place between the false rims and the cheeks, instead of between the belt and the false rims, as previously explained, with the result that the movement of the belt will rotate said false rims relatively to the cheeks. This rotary movement of the rims 11 will be transmitted through the flexible webs 15 to the false hub sections 16 and 17 which will likewise be rotated, the threaded section 17 transmitting its movement, in turn, to the nut 19. The latter will thereby be rotated and, at the same time, caused to move axially, due to which fact it shifts the hub 2 axially in an inward direction, or toward the right in Fig. 1, so that the hub flange 2' thus presses cheek 5 toward cheek 4 and, in consequence, tightens the grip on the belt rib.

It will be understood, of course, that the inward movement of hub 2 will take place irrespective of the direction in which the false hub 16—17 is being rotated by the belt—that is to say, the direction in which slippage of the belt takes place. This is due to the coaction between the nut 19 and the two stops 20, 21, the initial axial movement of the nut being of an ineffective or idle nature until it strikes against one stop or the other, whereupon its axial movement is checked and its continued rotation thereupon serves to effect the axial movement of the sliding hub.

I claim as my invention:—

1. A driving wheel for endless flexible track belts of the type having a longitudinal projection or rib on the inner surface thereof, comprising two companion cheeks arranged in spaced relation to grip the belt rib between them, one cheek mounted on and secured to a driving axle to rotate therewith; a hub fitting on and slidably keyed to said axle to be driven thereby and to which the other cheek is secured; belt-engaging means fitting between the rim portions of the two cheeks and on which the belt directly rests; a false hub encircling the sliding hub and adjacent portion of the axle and interposed between said cheeks; connections between the false hub and belt-engaging means to rotate said false hub relatively to the sliding hub and axle when slippage of the belt occurs; and a member interposed between the false and sliding hubs to shift the latter and the second-named cheek inward bodily along the axle toward the first cheek during and consequent upon the rotary movement of the former.

2. A driving wheel according to claim 1, in which the belt-engaging means comprise a pair of false rims which conform to the shape of the belt and the rim portions of the cheeks, and in which a pair of flexible webs is provided to connect the false rims and false hub together, each web being fastened at its outer circumferential edge to the inner edge of the respective false rim and at its inner edge to a circumferential projection on the false hub; substantially as described.

3. A driving wheel for endless flexible track belts of the type having a longitudinal projection or rib on the inner surface thereof, comprising two companion cheeks arranged in spaced relation to grip the belt rib between them, one cheek mounted on and secured to a driving axle to rotate therewith; a hub fitting on and slidably keyed to said axle to be driven thereby and to which the other cheek is secured, said hub having an externally threaded inner portion; belt-engaging means fitting between the rim portions of the two cheeks and on which the belt directly rests; a false hub encircling the inner portion of the sliding hub and the adjacent portion of the axle and interposed between said cheeks, said false hub having an internally threaded portion disposed immediately opposite the external threads on said sliding hub; connections between the false hub and belt-engaging means to rotate the former relatively to the sliding hub and axle when slippage of the belt occurs; and an externally and internally threaded nut interposed between the false and sliding hubs and engaging the threads thereon to transmit the rotary movement of the false hub to the sliding hub and to shift the latter and the second-named cheek inward bodily along the axle toward the first cheek.

4. A driving wheel according to claim 3, in which the false hub embodies two sections rigidly fastened together, one section being locked to the axle to prevent it from moving endwise thereon, and the other section having the threads formed on its inner surface; substantially as described.

5. A driving wheel according to claim 3, in which the nut is caused to rotate by the rotation of the false hub and is initially moved axially along the sliding hub during such rotation; and in which stops are provided to limit the axial movement of the nut in both directions, one stop being located on the sliding hub and the other on the fixed hub; substantially as described.

In testimony whereof I affix my signature.

ADOLPHE KÉGRESSE.